Figure 2:
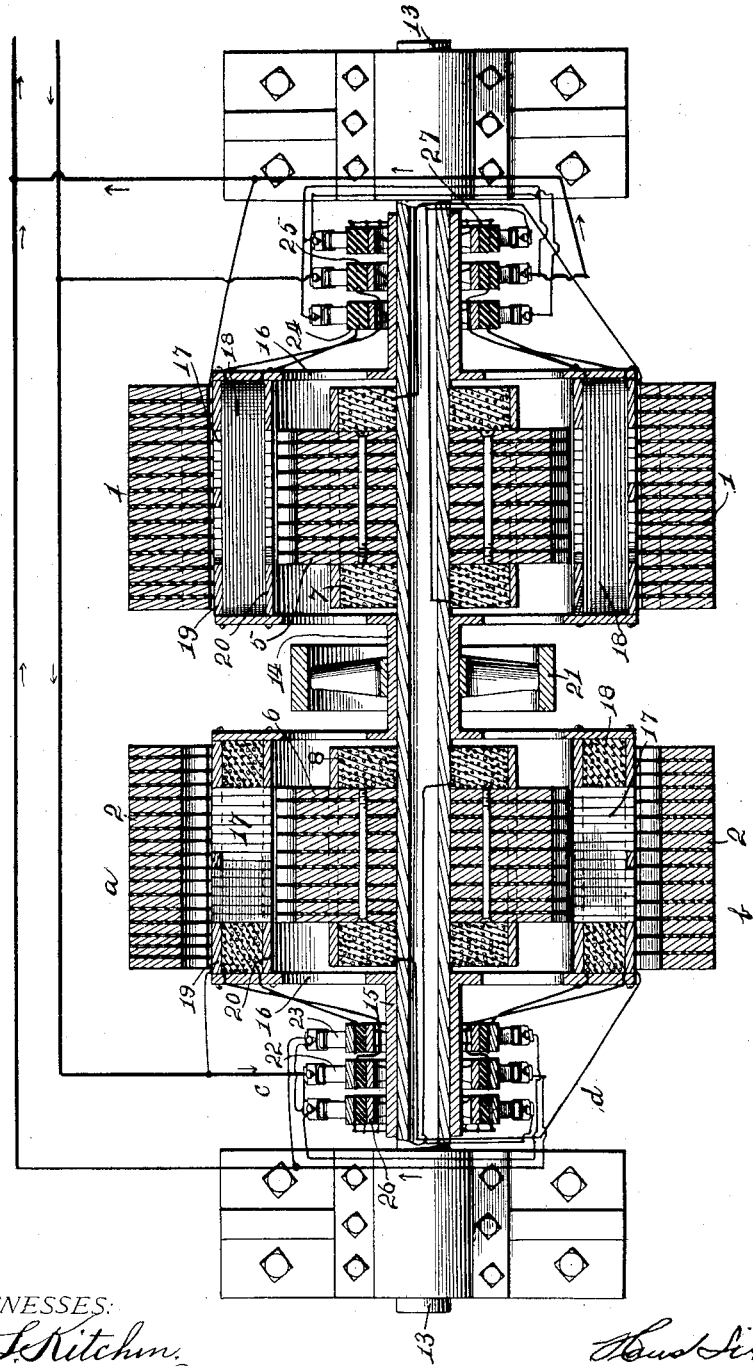

No. 752,236. PATENTED FEB. 16, 1904.
H. LIEBREICH.
ELECTRIC GENERATOR.
APPLICATION FILED JUNE 29, 1903.
NO MODEL. 5 SHEETS—SHEET 1.
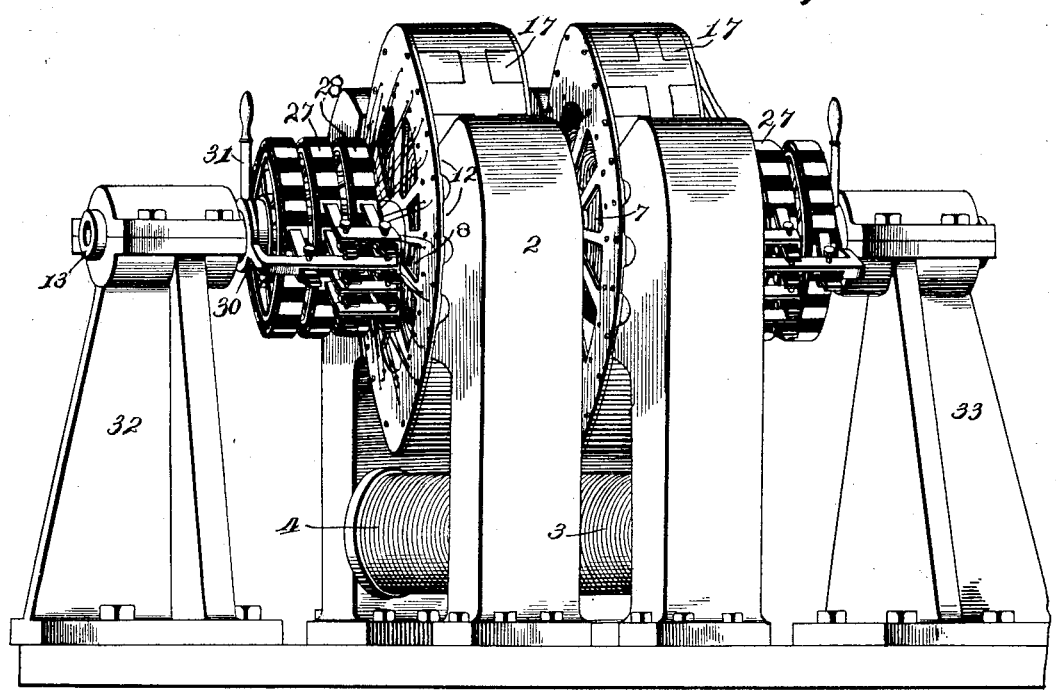
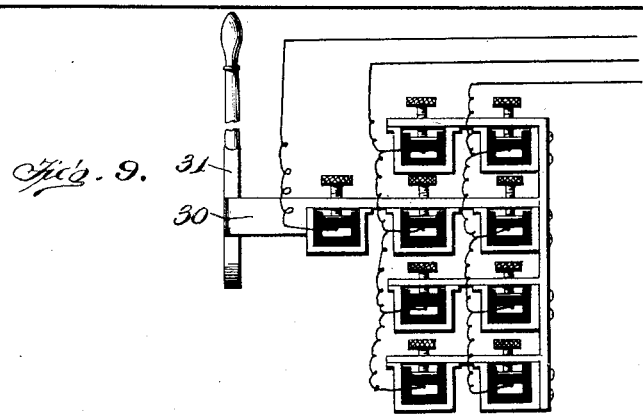
WITNESSES:
INVENTOR
Hans Liebreich
BY
Attorneys No. 752,236. PATENTED FEB. 16, 1904.
H. LIEBREICH.
ELECTRIC GENERATOR.
APPLICATION FILED JUNE 29, 1903.
NO MODEL. 5 SHEETS—SHEET 2.

WITNESSES: INVENTOR

No. 752,236. PATENTED FEB. 16, 1904.
H. LIEBREICH.
ELECTRIC GENERATOR.
APPLICATION FILED JUNE 29, 1903.
NO MODEL. 5 SHEETS—SHEET 3.
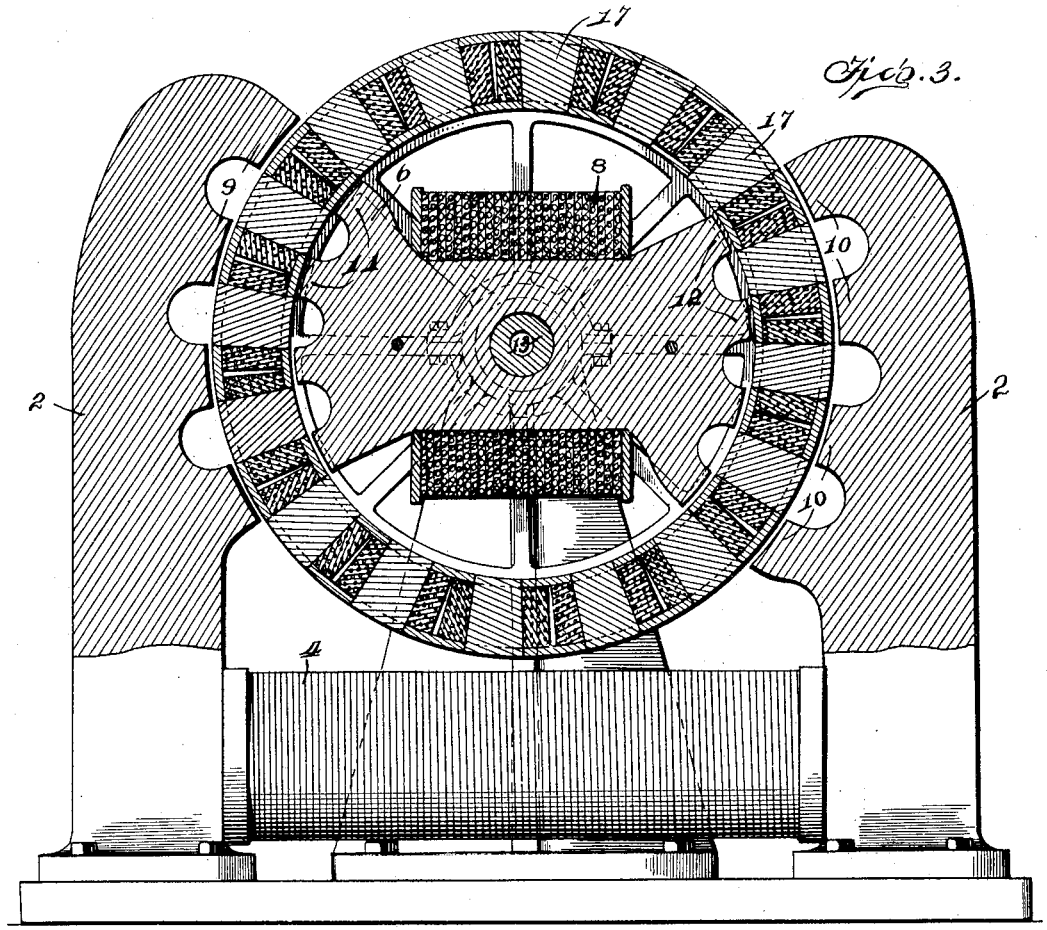
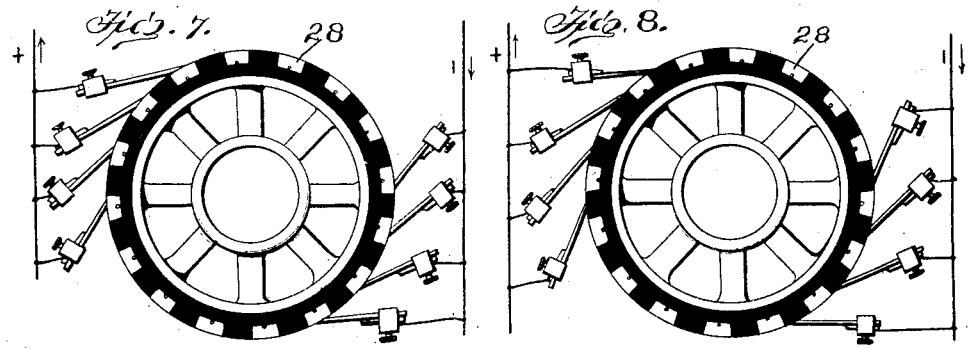
WITNESSES:
INVENTOR
Hans Liebreich,
BY
Attorney

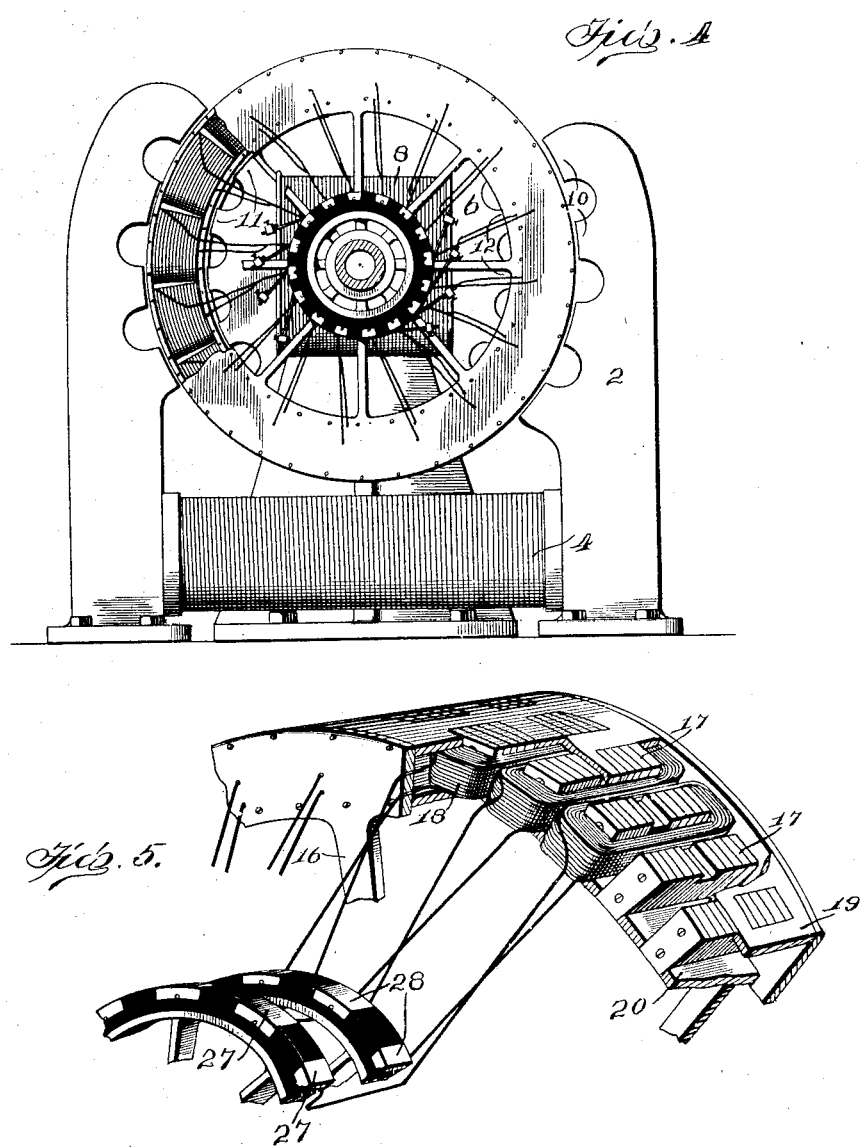

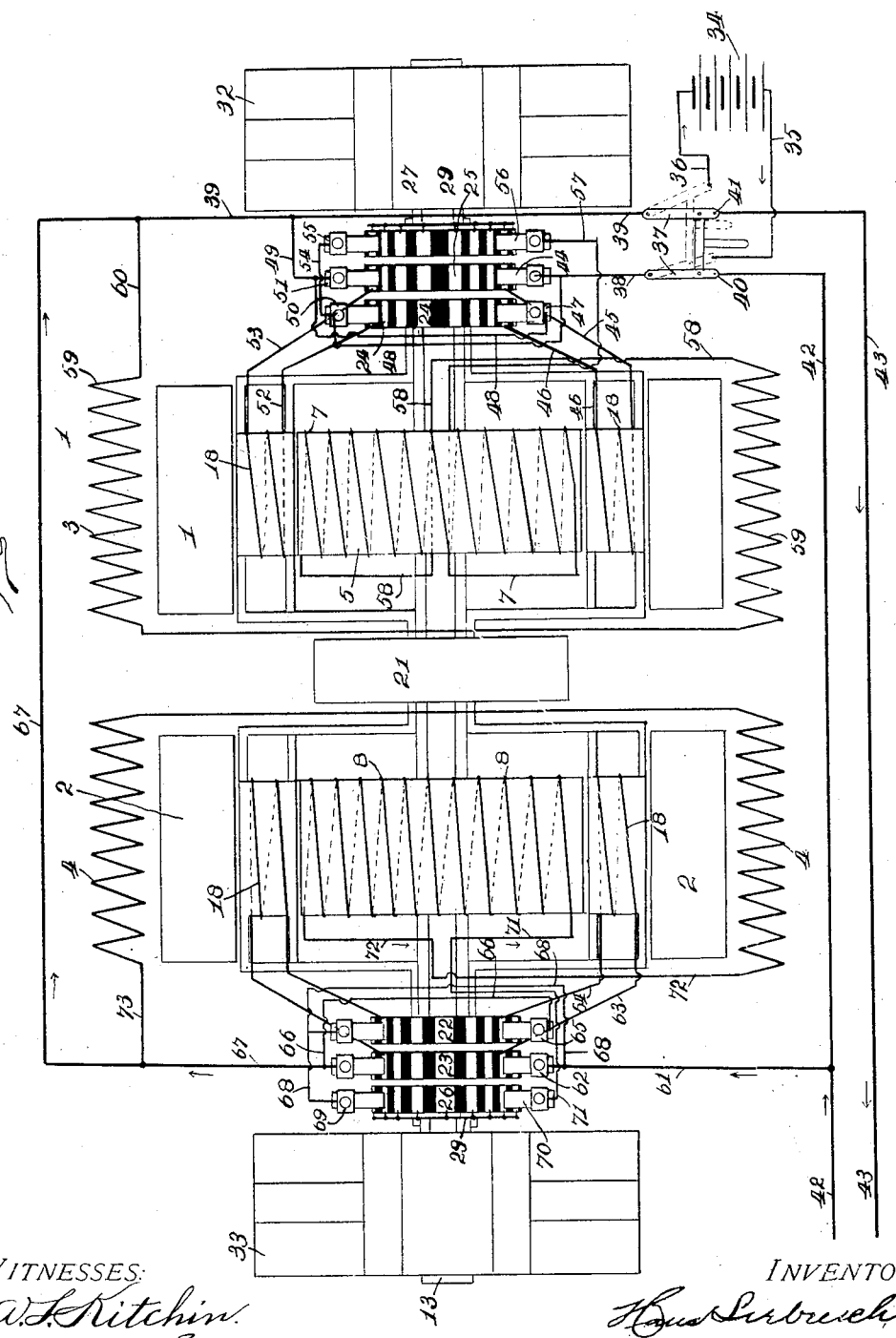

No. 752,236. Patented February 16, 1904.

UNITED STATES PATENT OFFICE.

HANS LIEBREICH, OF BOSTON, MASSACHUSETTS, ASSIGNOR TO INTERNATIONAL ELECTRIC COMPANY, A CORPORATION OF MAINE.

ELECTRIC GENERATOR.

SPECIFICATION forming part of Letters Patent No. 752,236, dated February 16, 1904.

Application filed June 29, 1903. Serial No. 163,556. (No model.)

*To all whom it may concern:*

Be it known that I, HANS LIEBREICH, a citizen of the United States, residing at Boston, in the county of Suffolk and State of Massachusetts, have invented certain new and useful Improvements in Electric Generators; and I do hereby declare the following to be a full, clear, and exact description of the invention, such as will enable others skilled in the art to which it appertains to make and use the same.

This invention relates to improvements in electric generators, and its object is the provision of a dynamo or generator which will be capable of greater efficiency in the producing of currents of electricity with a given expenditure of power than the generators now in use.

The invention consists in a generator comprising field-magnets, means for passing conductors through the magnetic field, and means for demagnetizing the field at a proper time to prevent the retarding effect of a continued cutting of the lines of force in the magnetic field.

It also consists in a generator provided with an inner and outer field, means for exciting the fields, and a rotating conductor-carrying ring arranged to move between the poles of the fields so as to cut the lines of force thereof.

It also consists in a generator provided with a plurality of inner and outer field-magnets, means for exciting the said field-magnets to produce a strong magnetic flux, and armatures carrying conductors, the said conductors being rotated through the lines of force of the magnetic fields, and means for collecting the current first from one ring and then from the other.

It further consists in a generator provided with inner and outer field-magnets, means for energizing and deënergizing the field-magnets alternately, means for connecting and disconnecting the armatures from the line conductors alternately, and means for passing conductors between the poles of the inner and outer magnets for generating a current of electricity.

It also consists in certain other novel constructions, combinations, and arrangements of parts, as will be hereinafter fully described and claimed.

In the accompanying drawings, Figure 1 is a perspective view of the generator constructed in accordance with my invention. Fig. 2 is a central horizontal section through the generator, taken upon the line of axis of its shaft. Fig. 3 is a vertical transverse section through the generator upon the line $a\,b$ of Fig. 2. Fig. 4 is a transverse vertical section through the generator, taken upon the line $c\,d$ of Fig. 2. Fig. 5 is a detail perspective view of a portion of the armature, showing its electrical connection with portions of the commutator-rings. Fig. 6 is a diagrammatic view showing the direction of the circuits passing through the mechanism. Fig. 7 is a side elevation of a collecting-ring used at one end of the generator. Fig. 8 is a similar view of a commutator at the other end of the generator, showing the position of its brushes when the commutator is in a position corresponding to the position of the commutator in Fig. 7. Fig. 9 is a detail view, in end elevation, of the brushes at one end of the generator, showing the manner of mounting them in proper position.

The generator or dynamo forming the subject-matter of this invention is so constructed that a current of electricity is generated with a very small expenditure of power in rotating the conductors which cut the lines of force in the magnetic field. The mechanism is so arranged also that when the conductors are cutting the lines of force, so as to generate a current traveling in the desired direction, the field-coils are energized for producing the proper magnetic field or flux; but when the conductors begin to cut the lines of force in the magnetic field, so as to alter the action of the moving conductors and tend to produce a retarding electromotive force, the field-coils are cut out.

In the accompanying drawings I have illustrated a mechanism which is well adapted for carrying out my invention. In this illustration 1 and 2 indicate outer field-magnets, and 3 and 4 coils wound upon the same, respectively.

5 and 6 indicate inner field-magnets which are located between the poles of the outer field-magnets, and 7 and 8 indicate coils wound upon the same. The outer field-magnets are preferably of the horseshoe type and are formed of laminated pieces of soft iron, the laminations being insulated from each other and secured together to form magnets of suitable thickness. The windings 3 and 4 are arranged around the central portion of the field-magnets, while the poles extend upwardly therefrom upon each side of the inner field-magnets, and each pole is formed with a series of pole points or projections 9 and 10. In the drawings accompanying this application I have shown four of such pole-points 9 and 10 for each pole of each magnet. Each inner magnet 5 and 6 is mounted between the said poles and is formed at each end with pole-points 11 and 12, which are arranged on radial lines extending from the center of the inner magnets through the pole-points 9 and 10 of the outer field-magnets. The shaft 13 of the generator extends through the center of each of said inner magnets. The shaft 13 is preferably a hollow shaft to accommodate the wiring of the generator, as will be hereinafter fully described. The magnets 5 and 6 are secured to the shaft 13, which is held stationary, so that the said inner magnets do not revolve, and the coils or windings of the conductors 7 and 8 pass around the magnets in planes parallel with the axis of the shaft 13, so that when the said coils are energized a magnetic flux will be produced at right angles to the plane of the coil and extend longitudinally through the body portion of each inner magnet, the said flux thus produced supplementing the magnetic flux which flows from one pole of each outer magnet toward the other pole thereof, and thus increases the efficiency of the generator.

Mounted upon the shaft 13 are sleeves 14 and 15, which carry spiders 16. The spiders carry near their peripheries a series of blocks of metal, as 17, the whole structure constituting armatures. The said blocks are preferably laminated, being formed of a number of leaves, preferably of soft iron, insulated from each other and held together in any suitable or desired manner. Surrounding these laminated blocks are coiled conductors. The blocks 17 are supported between the peripheral portions of the spider 16 by annular plates 19 and 20, the plates 19 being on the outer peripheral surface of the armatures produced by the structure just described and lying very close to the inner surfaces of the pole-points 9 and 10 of the field-magnets, while the inner plates 20 are flush with the inner ends of the metal blocks 17 and lie close to the outer surface of the pole-points of the inner magnets 11 and 12. The two rings formed travel thus between the pole-points of the outer and inner field-magnets and so that the conductors coiled upon the said rings cut the lines of force in the magnetic fields of said magnets. At the center of the generator adjacent spiders 16 are connected with the central sleeve 14 on the shaft 13, and a pulley 21 is secured to the said sleeve 14, so that it may be rotated by means of a belt or other connection with any source of power. By rotating the pulley 21 the spiders 16, carrying the blocks 17 and conductors 18, may be rotated at any desired speed between the poles of the magnets. The outer spiders 16 of the armature are secured to the outer sleeve-sections 15, journaled on the shaft 13. The sleeve-sections 15 carry inner and outer collecting-rings 22 and 23 at one end of the generator and inner and outer collecting-rings 24 and 25 at the other end of the generator. The said sleeve-sections 15 also carry circuit-controlling commutators 26 and 27. The wires forming the conductors 18 have their ends connected with the collecting-rings 22 and 23 at one end of the generator, while the conductors at the other end of the generator are connected with the collecting-rings 24 and 25. As illustrated in Fig. 5, one end of a conductor-wire passes from a contact-block 27 on one of the collecting-rings around its block 17 a suitable number of times and then to a block 28 on the other collecting-ring adjacent to the one from which the wire started. The collecting-rings carry as many blocks as there are coils of conducting material upon each ring. The blocks 27 and 28 of the commutator-rings are embedded in insulation, so as to be disconnected from each other, and brushes are employed for engaging said blocks and collecting the currents therefrom, the said brushes delivering the current to line conductors. The brushes engaging the collecting-rings at one end of the generator are in contact with the blocks 27 and 28 when the brushes at the other end of the generator are in contact with the insulating material between said blocks, so that the current is collected first from one ring and then from the other and passed to the line conductors. The commutator-blocks 26 and 27, carried by the sleeve-sections 15, are also engaged by brushes, which brushes are connected in series with the coils of the outer and inner field-magnets. In this instance also brushes of one commutator are engaging its contact-blocks when the brushes of the other commutator are engaging the insulating material, and vice versa. It thus happens that when the armatures are rotated together with the sleeves 15 the commutator-rings are also rotated and energize first one field-magnet and then the other. It will be evident also that when one field is magnetized the other one will be cut out or demagnetized. The collecting-rings 22, 23, 24, and 25 are also carried by the sleeves 15 on the shaft 13 and operate in conjunction with the commutators 26 and 27, so that when one field-magnet with its inner magnet is magnetized the conductors of the armature traveling between said outer and inner magnets will be capable of delivering the current generated in them through the collecting-rings to the brushes and the line conductors. Of course it will be evident that when a field and inner magnet is demagnetized the conductors of its rotating armature will be cut out, so that no current will be delivered by them as before. At this time of course the armature at the other end of the machine will be delivering its current, since the brushes of the collecting-rings are so connected with the line-wires that the currents generated by their respective armatures which carry the conductors 18 will deliver the electric current in the same direction.

A brush is provided for each end of each of the conductors carried by the rotating rings which are in the magnetic field at the same time, and these brushes are divided, one half being applied upon one side of the collecting-rings, while the other half is applied on the other side of the collecting-rings, as clearly illustrated in Figs. 7 and 8.

The blocks 26 and 27 upon the surfaces of the commutators while separated by insulated material so that they are disconnected from the brushes as the commutators revolve, yet said blocks are all connected by a common conductor 29, so that when the brushes engage a commutator, the brushes being arranged upon opposite sides thereof, the brushes will be electrically connected whenever they pass over the metallic conducting-blocks on the surface of the commutator, the said electrical connection being effected through the wire or conductor 29. Of course as soon as the brushes pass upon the insulation between the contact-blocks the circuit through them will be broken.

Any suitable carrying means may be provided for holding the brushes of the collecting-rings and commutators. In Figs. 1 and 9 a simple mechanism has been employed which comprises a frame 30, which is mounted upon the shaft 13 and may be rocked thereon by any suitable lever, as 31. The brushes are mounted within the insulating material, so as to be disconnected from each other and to prevent short-circuiting at this point.

The shaft 13 is preferably supported at its ends upon standards or pillar-blocks 32 and 33, and the mechanism above described is arranged within the same. As above intimated, the material of the inner and outer magnets and armature-blocks 17 is preferably formed of very soft iron, so that they may be quickly energized and deënergized through the action of the commutators. The blocks 17 preferably project through apertures in the inclosing plates 19 and 20 of the rotating rings, so as to be flush with the surfaces thereof, as shown in Fig. 5. The plates 19 and 20 serve not only to support these blocks in proper position, but form, together with the peripheral portions of the spider 16, a casing within which the coiled conductors 18 are inclosed. By having the blocks 17 formed with portions that project through to the outer surfaces of the plates 19 and 20 the said blocks can be made to pass very closely to the surfaces of the pole-points of both of the outer and inner field-magnets and assist in maintaining the establishment of a strong field flux. As the armature rotates the lines of force thus established, however, will be cut continually by the wires of the conducting-coils 18. The arrangement of the parts of the mechanism with relation to each other is such that when the ring rotates and a conductor 18 cuts into the lines of force between opposing pole-points the field will remain energized until the conductors begin to cut the lines of force so as to produce a retarding influence or back pull upon the action of the ring. As soon as this occurs the field-magnets at that end of the generator are cut out by the action of its commutator and the field at the other end of the generator is energized, and the conductors of its armature are connected with the line-wires, so that a current will be delivered by that set of conductors until the point is reached beyond which a retarding influence would be caused if the conductors continued their movement in the magnetic field. The second field is then cut out for preventing such retarding action and the first one is energized again. In this way a continuous current of electricity may be driven in the same direction through the line-wires without the usual retarding force caused by the continuous magnetic fields maintained in the usual structures of generators.

In operating the machine it is necessary to employ a suitable starting mechanism for exciting the field-magnets, and this may consist, as shown in Fig. 6, of a battery 34 or other suitable source of electrical energy, the battery-conductors 35 and 36 being connected with contacts capable of engagement with a switch 37. The switch 37 is connected with the line-wires 38 and 39 of the generator and when moved from the contacts of the starting device is capable of engaging contacts 40 and 41 of the main-line wires 42 and 43 for delivering the current generated into said main-line wires. By reference to the diagrammatic view shown in Fig. 6 the direction taken by the currents passing through the generator can be readily observed. In starting the device the switch is placed as shown in dotted lines in Fig. 6, so that a starting-current through the source of electricity 34 will pass through the wire 35 and switch 37 to the line-wire 38. The current will then branch, one branch of the current passing to one of the brushes, as 44 of the collecting-ring 25. The current will then pass from the contact-block beneath said brush through the conducting-wire 45 of the coil 18, with which the said block is connected. After passing through said coil the current flows out through a wire 46 to its contact-block upon the collecting-ring 24, and thence to the brush 47 engaging it, and from the brush the current passes through wire 48 to a wire 49, and thence to the return line-wire 39. From the generator line-wire 39 the current then passes through one member of the switch 37 to the wire 36 of the battery 34, completing the circuit. The current just described is of course augmented by a series of brushes, which are collecting currents from the traveling conductors 18 simultaneously. A second set of brushes, as 50 and 51, are shown in the diagrammatic view 6, the current passing from the brush 50, which is also connected with the line-wire 38, through the wires 52, to the coil 18, and thence through the wire 53 to the commutator 25, from which it is taken off by the brush 51, which is connected with the wire 49. In this manner the current generated in the second coil 18 is collected and passed to the return-wire 39. The same action is taking place with other brushes and conducting-wires as said conducting-wires pass between the poles of the magnets and the armatures. As above intimated, the current is split as it passes from the wire 38, and part of it instead of passing through the brushes described passes from said wire 38 by means of a wire 54 to the brush 55 of the commutator 27. The current then passes through the common conductor 29 of that commutator to the brush 56 on the opposite side thereof, and thence by a wire 57 to the coil 7 of the adjacent inner magnet, and thence by a wire 58 to the coils 59 of the adjacent outer field-magnet, thus exciting both the outer and inner field-magnets. The current returns from the coil 59 through a wire 60 to the wire 39, and thence to a source of electrical energy 34, completing the current. Of course it will be understood that as soon as the field-magnets have been energized to start the generator, the rotation of the armature having been started also, the switch 37 is thrown so as to connect the wires 38 and 39 with the wires 42 and 43, and thus the current generated by the conductors 18 will be continuously supplied to the main-line wires 42 and 43. The movement of the current upon the conductors at the other end of the generator will be practically the same as that just described and may be preferably traced as follows: The generator, of course, is considered as started. The current will pass from the line-wire 42 through the wire 61 to the brush 62, and thence through the commutator 23, wire 63, and coil 18 to wire 64, and thence to the commutator 22, brush 65, wire 66, and wire 67 to the return-wire 39, and thence to the main-line wire 43. Some of the current, however, will leave the wire 61 and pass through the wire 68 to the brush 69 of the commutator 26. The current will then pass through the common conductor 29 to the brush 70, wire 71, to the coil 8 of the magnet 6. From the said coil the current passes by means of the wire 72 to the coils 4 of the field-magnet 2 and from said coils by means of a wire 73 to the wire 67, and thence to the return-wire 39 and main-line wire 43. In this manner a current is collected first from one magnetic field and then the other, one field and then the other being established at the same time and alternately demagnetized by the action of the commutators 26 and 27, as above described.

From the above description it will be evident that my improved generator is of a construction which is capable of operation with a minimum amount of power for rotating the conductors which cut the magnetic field, especially as the magnetic fields are alternately demagnetized at the proper time to prevent the back pull of the electric current. The arrangement of the inner stationary magnets between the poles of the outer magnets is also of importance, as the exciting of the said inner magnets at the same time when the outer magnets are excited aids very materially in increasing the magnetic flux passing from one pole of the magnet to the other.

I do not wish to be understood as limiting my invention to the employment of two field-magnets and armatures, since the number of such field-magnets and armatures might be increased without departing from the spirit of the invention, provided, of course, the electrical connections were such as to accommodate a similar action to that above described.

It will be noted that in my improved generator when the magnetic field is established it flows from the negative pole of one field-magnet to the positive end of the adjacent armature-block and thence out the negative end of said block to the positive pole of the inner magnet, and after passing through the same leaves it from its negative end, passing to the positive end of the adjacent armature-block and thence to the negative end of said block and from that to the positive poles of the outer field-magnet and thence back to the negative pole of said magnet, completing the magnetic field.

In a generator constructed in accordance with this invention it will be observed that the rotating part or armature is much lighter than the rotating part or armature of the common generators in use. In the present case merely the armature frames and blocks carrying the conductors are moved, making a very light ring or rotating member. The inner magnet remains stationary, as does the outer field-magnet.

Having thus fully described my invention, what I claim as new, and desire to secure by Letters Patent, is—

1. A generator comprising field-magnets, means for passing conductors through the magnetic field and means for demagnetizing the field at a proper time to prevent the retarding effect of a continued cutting of the lines of force in the magnetic field.

2. A generator provided with field-magnets having an annular space between them, armatures rotating in said space carrying conductors, means for exciting the field until the conductors have cut through a portion of the field, and means for deënergizing the field-magnets for the remainder of the movement.

3. A generator provided with a plurality of field-magnets, means for exciting the said field-magnets to produce a strong magnetic flux, and armatures carrying conductors, the said conductors being rotated through the magnetic lines of force of the magnetic fields and means for collecting the current first from one armature and then from the other.

4. A generator comprising outer field-magnets and an inner magnet between its poles, an armature rotating through the space between the poles of the outer and inner magnets, said armature carrying coils, means for energizing the magnets until one side of the winding of each coil cuts through lines of force in the field, and means for deënergizing the field before the other side of each winding enters the field.

5. A generator comprising field-magnets having a series of pole-points, an inner magnet having corresponding pole-points, an armature rotating between the pole-points and carrying coiled conductors, means for energizing the field-magnets while the conductors are cutting the lines of force of each set of magnet-poles, and means for deënergizing the field when the coils are leaving the lines of force between said pole-points.

6. A generator comprising outer field-magnets having a series of pole-points projecting inwardly, an inner stationary magnet arranged between the pole-points and having corresponding pole-points, an armature passing between the sets of pole-points, said armature carrying coiled conductors, means for energizing the magnets when one side of each coil is cutting into the lines of force of a set of pole-points, means for deënergizing the magnets when the other side of each coil approaches the lines of force between the sets of pole-points.

7. An electric generator comprising a plurality of outer field-magnets and a plurality of inner field-magnets, a plurality of armatures rotatably mounted between the poles of the said magnets and commutator-rings causing the alternate magnetizing and demagnetizing of the several fields in accordance with the movement of the armatures.

8. A generator comprising outer field-magnets and inner magnets located between their poles, means for exciting the said magnets, rotating armatures mounted between said poles, collector-rings for collecting the current generated in the said conductors, and commutators for energizing and deënergizing the magnets in accordance with the movement of the armatures.

9. A generator comprising laminated field-magnets, laminated magnets mounted between them, a shaft passing through the center of the inner magnets, armatures mounted on said shaft and carrying conductors, the said conductors moving between the poles of the field-magnets and the inner magnets, collecting-rings for collecting the currents generated in the conductors and commutator-rings for controlling the magnetizing and demagnetizing of the field-magnets and inner magnets.

10. A generator comprising a pair of field-magnets, stationary field-magnets mounted between the poles of each magnet, a hollow shaft running through the inner field-magnets and mounted upon suitable bearings, frames extending from said hollow shaft forming an armature, conducting-coils carried by said armature so as to cut the magnetic fields established through the field-magnets, collecting-rings connected with the said conducting-coils, commutator-rings and means passing through the hollow shaft for electrically connecting the commutators with the fields, a pulley secured to the hollow shaft and receiving motion from any suitable source of power, the coils of the field-magnets together with the coils of the armatures being connected in series with the line conductors.

11. A generator comprising field-magnets and inner magnets located between the poles thereof, an armature revolving through the space between the poles of the magnets, the said armature carrying metallic pieces at intervals for forming bridging material for the magnetic flux, coils of conducting material lying between the said metallic pieces for cutting the magnetic field and generating currents of electricity.

12. A generator comprising field-magnets, a shaft mounted so as to pass between the poles of said magnets, inner magnets secured to said shaft and held in a stationary position between said poles, armatures movably mounted on said shaft, the peripheral portions of said armatures traveling between the poles of the magnets, commutators traveling with the said moving members, brushes for collecting the current generated by the movement of said members and other commutators for alternately energizing and deënergizing first one field and then another.

13. A generator comprising a shaft mounted on suitable framing, a pair of field-magnets arranged in planes at right angles to the shaft with their poles diametrically opposite the same, magnets mounted upon the shaft and arranged between the poles of said field-magnets, a shell surrounding the shaft and movable thereon, the said shell carrying coiled conductors, the said conductors moving between the poles of the outer and inner magnets so as to cut the lines of force passing through the same, commutators for collecting the currents generated by the said coils in their movement through the magnetic field and commutators for controlling the energizing and deënergizing of the field-magnets.

14. A generator comprising outer and inner field-magnets, armatures traveling between the poles of the said magnets, and an exciting mechanism capable of being connected with the field-coils and means for switching the said exciting mechanism into and out of circuit with the said coils for supplying the initial exciting-current to said fields.

15. A generator comprising field-magnets of the horseshoe type, and inner magnets arranged between the poles of said magnets, and an armature traveling between the poles of the magnetic fields and the poles of the inner magnets, the magnetic field being established from the negative poles of the magnets through the positive and then the negative poles, carried by the armature, to the positive poles of the magnets and in a similar manner from the magnets to the positive poles of the outer magnets again.

16. A generator comprising field-magnets, a rotating armature operating in connection therewith, means for collecting a current from the armature while it is cutting lines of force in the field so as to send the current through its conductors in one direction, means for cutting off the said armature from the line conductors when the conductors of the armature begin to cut the lines of force so as to produce a retarding effect.

17. A generator comprising a pair of field-magnets, a pair of inner magnets arranged between the poles of each of the field-magnets, a pair of armatures rotating within the two fields, means for energizing the magnets of one field during a portion of the revolution of its armature, means for cutting out said field and at the same time energizing the field of the other magnet and vice versa.

18. A generator comprising two sets of field-magnets, each set being made up of an outer and an inner magnet, a series of pole-points upon each outer and inner magnet arranged opposite each other, armatures rotating in the spaces between each outer and inner field-magnet, conductors carried by the armatures, means for deënergizing each field-magnet, alternately during the time that a portion of each armature-conductor is passing between a set of pole-points, and means for deënergizing the magnets alternately during the remainder of the movement of each coil through said set of pole-points.

19. A generator comprising field-magnets having an annular space between their pole-points, a series of pole-points projecting from the poles of the said magnets of a suitable width, an armature rotating in the annular space between the magnets, carrying a series of soft-iron blocks of the same width as the width of the pole-points to assist in forming and maintaining the magnetic field, conductors wound about said blocks, and means for energizing the field-magnets while a portion of each conductor is passing between a set of pole-points, and means for deënergizing the field during the remainder of the movement of such conductor between that set of pole-points.

In testimony whereof I hereunto affix my signature in presence of two witnesses.

HANS LIEBREICH.

Witnesses:
  JOHN L. FLETCHER,
  CASSELL SEVERANCE.